United States Patent
Arise et al.

(10) Patent No.: US 12,407,067 B2
(45) Date of Patent: Sep. 2, 2025

(54) SEPARATOR AND NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Saki Morizane, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 766 days.

(21) Appl. No.: 17/698,021

(22) Filed: Mar. 18, 2022

(65) Prior Publication Data
US 2022/0302552 A1 Sep. 22, 2022

(30) Foreign Application Priority Data

Mar. 19, 2021 (JP) .................. 2021-046209
Feb. 24, 2022 (JP) .................. 2022-027138

(51) Int. Cl.
*H01M 50/417* (2021.01)
*H01M 50/489* (2021.01)

(52) U.S. Cl.
CPC ................. *H01M 50/417* (2021.01)

(58) Field of Classification Search
CPC ........... H01M 50/417; H01M 10/0525; H01M 50/423; H01M 50/434; H01M 50/443; H01M 50/446; H01M 50/451; H01M 50/489; H01M 50/40; H01M 50/449; H01M 10/052; H01M 2300/0025; Y02P 70/50

See application file for complete search history.

(56) References Cited

U.S. PATENT DOCUMENTS

2019/0386275 A1* 12/2019 Otsuka .................. H01M 50/42

FOREIGN PATENT DOCUMENTS

| JP | 10-055794 A | 2/1998 |
|----|-------------|--------|
| JP | 2020-068178 A | 4/2020 |

* cited by examiner

*Primary Examiner* — Niki Bakhtiari
*Assistant Examiner* — Madison Leigh Kyle
(74) *Attorney, Agent, or Firm* — Panitch Schwarze Belisario & Nadel LLP

(57) ABSTRACT

A nonaqueous electrolyte secondary battery separator has a short circuit prevention effect improved by controlling the shape of a dendrite. In the nonaqueous electrolyte secondary battery separator, when unevenness data of at least one surface of the separator is analyzed, kurtosis of a data group of heights from a reference level is not less than 5, and standard deviation of the data group of the heights from the reference level is not more than 12.

8 Claims, No Drawings

SEPARATOR AND NONAQUEOUS ELECTROLYTE SECONDARY BATTERY

This Nonprovisional application claims priority under 35 U.S.C. § 119 on Patent Application No. 2021-046209 filed in Japan on Mar. 19, 2021 and Patent Application No. 2022-027138 filed in Japan on Feb. 24, 2022, the entire contents of which are hereby incorporated by reference.

TECHNICAL FIELD

The present invention relates to a separator and a nonaqueous electrolyte secondary battery.

BACKGROUND ART

Nonaqueous electrolyte secondary batteries, particularly lithium ion secondary batteries, have a high energy density, and are therefore widely used as batteries for personal computers, mobile telephones, portable information terminals, cars, and the like.

In recent years, there has been high demand for lithium ion secondary batteries which have high output power. In order to satisfy the demand, development of lithium ion secondary batteries provided with a separator excellent in ion permeability is in progress.

However, such lithium ion secondary batteries have a problem in that a lithium deposit which has grown fibrous tends to cause a micro short circuit and to consequently lead to voltage reduction. The micro short circuit is one factor that lowers long-term reliability of those batteries.

In relation to this, Patent Literature 1 discloses a porous film that has a skin layer which is formed on at least one surface of the porous film and which has a specific void area ratio in an in-plane direction. Further, Patent Literature 2 discloses a separator which has a pattern area in which a pattern is formed and a non-pattern area in which no pattern is formed.

CITATION LIST

Patent Literature

[Patent Literature 1]
Japanese Patent Application Publication, Tokukaihei, No. 10-055794
[Patent Literature 2]
Japanese Patent Application Publication, Tokukai, No. 2020-068178

SUMMARY OF INVENTION

Technical Problem

However, in a method for inhibiting growth of a dendrite in lithium ion secondary batteries, there has been room for further development. For example, the dendrite is known to become more fibrous as the dendrite grows. The more fibrous the dendrite becomes, the easier it is for the dendrite to extend in pores of a separator. Accordingly, in order to prevent a short circuit that may occur as a result of growth of the dendrite, controlling the shape of the dendrite is important. However, in the above literatures, controlling the shape of a dendrite is not taken into consideration.

An object of an aspect of the present invention is to provide a separator for a nonaqueous electrolyte secondary battery (hereinafter referred to as a "nonaqueous electrolyte secondary battery separator") which has a short circuit prevention effect improved by controlling the shape of a dendrite.

Solution to Problem

The present invention encompasses the following aspects.
<1>
A nonaqueous electrolyte secondary battery separator, wherein
when unevenness data of at least one surface of the separator is analyzed,
kurtosis of a data group of heights from a reference level is not less than 5, the kurtosis of the data group indicating a distribution curve having a shaper peak than a normal distribution curve if the kurtosis is not less than 0, and the kurtosis that is larger indicating a sharper distribution curve, and
standard deviation of the data group of the heights from the reference level is not more than 12.
<2>
The separator as set forth in <1>, being a laminated separator provided with a porous layer and a polyolefin porous film.
<3>
The separator as set forth in <2>, wherein the porous layer contains a nitrogen-containing aromatic resin.
<4>
The separator as set forth in <3>, wherein the nitrogen-containing aromatic resin is an aramid resin.
<5>
The separator as set forth in any one of <1> to <4>, wherein a compressive elastic modulus in a thickness direction is not less than 50 MPa.
<6>
A nonaqueous electrolyte secondary battery member, including a positive electrode, a separator described in any one of <1> to <5>, and a negative electrode, which are formed in this order.
<7>
A nonaqueous electrolyte secondary battery, including a separator as described in any one of <1> to <5> or a nonaqueous electrolyte secondary battery member as described in <6>.

Advantageous Effects of Invention

An aspect of the present invention provides a nonaqueous electrolyte secondary battery separator which has a short circuit prevention effect improved by controlling the shape of a dendrite.

DESCRIPTION OF EMBODIMENTS

The following description will discuss embodiments of the present invention. Note, however, that the present invention is not limited to the embodiments. The present invention is not limited to arrangements described below, but may be altered in various ways by a skilled person within the scope of the claims. The present invention also encompasses, in its technical scope, any embodiment derived by combining technical means disclosed in differing embodiments. Any numerical range expressed as "A to B" herein means "not less than A and not more than B" unless otherwise stated.

[1. Nonaqueous Electrolyte Secondary Battery Separator]
According to novel finding of the inventors of the present invention, the shape of a dendrite which grows on a surface of a negative electrode can be controlled by controlling smoothness of a surface of a separator included in a non-aqueous electrolyte secondary battery. In other words, if a separator has a highly smooth surface on a side which faces a negative electrode, a growing dendrite can be controlled to be granular or tabular. Even if a dendrite having such a shape is formed, the dendrite is unlikely to penetrate through the separator. On the contrary, a separator having low smoothness on a side which faces a negative electrode causes a fibrous dendrite to grow. The dendrite having such a shape is highly likely to penetrate through the separator.

In the present specification, the smoothness of a separator surface is expressed by parameters which are obtained as a result of analyzing unevenness data of the separator surface. The parameters are kurtosis of a data group of heights from a reference level, and standard deviation of the data group of the heights from the reference level. The kurtosis and the standard deviation each, by definition, take one specific value for one separator surface, regardless of where the reference level is set on the separator surface.

In an embodiment, the reference level is set to be a plane including a point which is deeper than the deepest point of dents on the separator surface. In this case, all of the heights from the reference level in the data group take positive values. In an embodiment, the reference level refers to a plane which includes the deepest point (a point at which the height is zero) of a standard sample whose height of unevenness has been adjusted to a predetermined value. In this case, the data group of the heights from the reference level of the separator surface is obtained by comparing the separator surface with the standard sample. In an embodiment, the standard sample is a sample whose height of unevenness has been adjusted to 54.6 μm.

A separator in accordance with an embodiment of the present invention has at least one surface whose kurtosis of the data group of the heights from the reference level is not less than 5, preferably not less than 6, and more preferably not less than 8. The kurtosis is, for example, not more than 124, not more than 80, not more than 60, not more than 40, or not more than 30. The kurtosis is an index that indicates the sharpness of a distribution curve. In an embodiment, the kurtosis of a normal distribution is set to 0. In another embodiment, the kurtosis of the normal distribution is set to 3.

A separator in accordance with an embodiment of the present invention has at least one surface whose standard deviation of the data group of the heights from the reference level is not more than 12, preferably not more than 10, and more preferably not more than 8. The standard deviation is, for example, not less than 0 or not less than 0.1.

The unevenness data of the separator surface can be obtained from, for example, an optical microscopic image of the separator surface. The kurtosis and the standard deviation of the data group of the heights from the reference level are calculated by analyzing the unevenness data of the separator surface. It should be noted here that for the data group of the heights from the reference level, on the basis of which the kurtosis and the standard deviation are calculated, a sampling rate is preferably not less than 100 thousand pixels and more preferably not less than 150 thousand pixels.

The following shows an example of a method for calculating the kurtosis and the standard deviation of the data group of the heights from the reference level when Image J (provided by the National Institute of Health (NIH)) is used as image analysis software. See Examples of the present application for more detailed examples of a measurement method.

1. Take in unevenness data of a separator surface (for example, a 3D image of the separator surface), and select a rectangular area by use of a polygon tool so that all bumps and dents (unevenness) can be contained. In selecting the rectangular area, care should be taken so that an area irrelevant to the separator surface (e.g., file name of the image, black background, etc.) would not be contained in the rectangular area.

2. Select "Edit-clear outside" from a pulldown menu, and trim a portion which is outside the area which has been selected.

3. Select "Analyze-histogram" from the pulldown menu, and automatically analyze the unevenness data. As a result of this operation, a maximum value, a minimum value, an average value and a standard deviation value are calculated. This standard deviation value is the standard deviation of the data group of the heights from the reference level.

4. Check "Set measurement kurtosis" and select "Analyze measure". As a result of this operation, the kurtosis of the data group of the heights from the reference level is calculated.

According to further finding of the inventors of the present invention, rigidity in a thickness direction of the separator can also be a factor for controlling the shape of the dendrite which grows on the surface of the negative electrode. A separator having high rigidity in the thickness direction of the separator is unlikely to deform in the thickness direction. This makes it difficult to form a space between the negative electrode and the separator. Under such a condition, the shape of a growing dendrite tends to be granular or tabular. Even if a dendrite having such a shape is formed, the dendrite is unlikely to penetrate through the separator. On the contrary, a separator having low rigidity in the thickness direction of the separator is likely to deform in the thickness direction. This makes it easy to form a space between the negative electrode and the separator. This tends to cause a fibrous dendrite to grow. The dendrite having such a shape is highly likely to penetrate through the separator.

In the present specification, the rigidity in the thickness direction of the separator is expressed by a compressive elastic modulus in the thickness direction of the separator. In an embodiment, the compressive elastic modulus in the thickness direction of the separator is preferably not less than 50 MPa, more preferably not less than 55 MPa, still more preferably not less than 60 MPa, and particularly preferably not less than 75 MPa. In an embodiment, the compressive elastic modulus in the thickness direction of the separator is preferably not more than 300 MPa, more preferably not more than 250 MPa, still more preferably not more than 175 MPa, and particularly preferably not more than 125 MPa. Examples of a combination of a lower limit and an upper limit of the compressive elastic modulus in the thickness direction of the separator include 50 MPa to 300 MPa, 55 MPa to 250 MPa, 60 MPa to 175 MPa, and 75 MPa to 125 MPa. The compressive elastic modulus in the thickness direction of the separator is measured by using a micro compression tester. For example, MCT-510 (manufactured by Shimadzu Corporation) is used as the micro compression tester.

In the present specification, the shape of the dendrite is determined on the basis of an SEM image (magnification: 5000 times). In the present specification, the shape of the dendrite is classified by an aspect ratio (value of long diameter to short diameter) of the dendrite. A dendrite having an aspect ratio of less than 2 is referred to as "granular". A dendrite formed by a plurality of connected granular dendrites is referred to as "tabular". A dendrite having an aspect ratio of more than 13 is referred to as "fibrous". See Examples of the present application for a test method for generating a dendrite. The shape of the dendrite generated in a dendrite generating test is most preferably granular, and second most preferably tabular. Since a fibrous dendrite may penetrate through the separator, the fibrous dendrite is not preferable.

[1.1. Laminated Separator]

In an embodiment, the separator is a laminated separator which includes a porous layer and a polyolefin porous film. The laminated separator includes the porous layer on one or both surfaces of the polyolefin porous film.

When the porous layer is provided on one surface of the polyolefin porous film, the surface which satisfies the above-described smoothness conditions may be a surface of a porous layer or the surface of the polyolefin porous film. The surface which satisfies the above-described smoothness conditions faces the negative electrode when the laminated separator is assembled into a nonaqueous electrolyte secondary battery.

(1.1.1 Porous Layer)

In the nonaqueous electrolyte secondary battery, the porous layer can be provided, as a member forming the nonaqueous electrolyte secondary battery separator in accordance with an embodiment of the present invention, between the polyolefin porous film and at least one of a positive electrode and the negative electrode.

The porous layer can be formed on an active material layer of at least one of the positive electrode and the negative electrode in the nonaqueous electrolyte secondary battery. The porous layer may be provided between the polyolefin porous film and at least one of the positive electrode and the negative electrode so as to be in contact with the polyolefin porous film and the at least one of the positive electrode and the negative electrode. Alternatively, the porous layer itself which does not include the polyolefin porous film may serve as the nonaqueous electrolyte secondary battery separator, though such a porous layer is not an aspect of the laminated separator. The porous layer may be made of one or more layers.

The porous layer contains a resin. The porous layer is preferably an insulating porous layer which contains an insulating resin.

When the porous layer is formed on one surface of the polyolefin porous film, the porous layer is preferably formed on a surface which faces the negative electrode in the nonaqueous electrolyte secondary battery, the surface being one of surfaces of the polyolefin porous film. More preferably, the porous layer is formed on a surface in contact with the negative electrode in the nonaqueous electrolyte secondary battery.

(Resin)

It is preferable that the resin be insoluble in an electrolyte of the battery and be electrochemically stable when the battery is in normal use.

Examples of the resin include polyolefins; (meth)acrylate-based resins; nitrogen-containing aromatic resins; fluorine-containing resins; polyamide-based resins; polyimide-based resins; polyester-based resins; rubbers; resins each having a melting point or a glass transition temperature of not lower than 180° C.; water-soluble polymers; and polycarbonate, polyacetal, and polyether ether ketone.

Among the above resins, one or more selected from the group consisting of polyolefins, (meth)acrylate-based resins, fluorine-containing resins, nitrogen-containing aromatic resins, polyamide-based resins, polyester-based resins and water-soluble polymers are preferable.

Further, nitrogen-containing aromatic resins are particularly preferable as the resin. The nitrogen-containing aromatic resins are excellent in heat resistance since the nitrogen-containing aromatic resins include a bond via nitrogen, such as an amide bond. Therefore, when the resin is a nitrogen-containing aromatic resin, the heat resistance of the porous layer can be suitably improved. This consequently improves heat resistance of the nonaqueous electrolyte secondary battery separator containing the porous layer.

Preferable examples of the polyolefins include polyethylene, polypropylene, polybutene, and an ethylene-propylene copolymer.

Examples of the fluorine-containing resins include: polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; and a fluorine-containing rubber having a glass transition temperature of not more than 23° C. among the fluorine-containing resins.

The polyamide-based resins are preferably polyamide-based resins which are nitrogen-containing aromatic resins, and particularly preferably aramid resins such as aromatic polyamides and wholly aromatic polyamides.

Specific examples of the aramid resins include poly (paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly (metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among the above aramid resins, poly (paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Note that it is possible to use, as the resin, only one of the above resins or two or more of the above resins in combination. The resin is contained in the porous layer at a proportion of preferably 25% by weight to 80% by weight and more preferably 30% by weight to 70% by weight when the total weight of the porous layer is 100% by weight.

(Filler)

In an embodiment of the present invention, the porous layer preferably contains a filler. The filler may be an inorganic filler or an organic filler. The filler is preferably an inorganic filler which is made of one or more inorganic oxides selected from the group consisting of silica, calcium oxide, magnesium oxide, titanium oxide, alumina, mica, zeolite, aluminum hydroxide, boehmite, and the like.

Note that in order to improve a water-absorbing property of the inorganic filler, it is possible to subject an inorganic filler surface to a hydrophilization treatment with, for example, a silane coupling agent.

The filler is contained in the porous layer, at a proportion of preferably not less than 20% by weight and more preferably not less than 30% by weight when the total weight of the porous layer is 100% by weight. Meanwhile, the filler contained in the porous layer is contained at a proportion of preferably not more than 80% by weight and more preferably not more than 70% by weight when the total weight of the porous layer is 100% by weight. Examples of a combination of a lower limit and an upper limit include 20% by weight to 80% by weight, and 30% by weight to 70% by weight. If the content of the filler is within the above range, it is possible to easily obtain a porous layer which has sufficient ion permeability.

The porous layer is preferably provided between the polyolefin porous film and a negative electrode active material layer which is provided in the negative electrode. Physical properties of the porous layer in the description below indicate those of the porous layer which is provided between the polyolefin porous film and the negative electrode active material layer provided in the negative electrode, when the nonaqueous electrolyte secondary battery is configured.

The porous layer has a weight per unit area which can be set as appropriate in view of strength, thickness, weight, and handleability of the porous layer. The weight per unit area of the porous layer is preferably 0.5 g/m$^2$ to 3.5 g/m$^2$ per layer and more preferably 1.0 g/m$^2$ to 3.0 g/m$^2$ per layer of the porous layer.

If the porous layer has a weight per unit area which is set to fall within the above numerical range, the nonaqueous electrolyte secondary battery including the porous layer can have a higher weight energy density and a higher volume energy density. If the weight per unit area of the porous layer is beyond the above range, the nonaqueous electrolyte secondary battery including the porous layer tends to be heavy.

The porous layer has a porosity of preferably 20% by volume to 90% by volume, and more preferably 30% by volume to 80% by volume, in order to achieve sufficient ion permeability.

The porous layer has pores whose diameter is preferably not more than 1.0 μm, and more preferably not more than 0.5 μm. If the pores each have such a diameter, the nonaqueous electrolyte secondary battery including the porous layer can achieve sufficient ion permeability.

The porous layer has an air permeability of preferably 30 s/100 mL to 80 s/100 mL, and more preferably 40 s/100 mL to 75 s/100 mL, in terms of Gurley values. If the air permeability of the porous layer is within the above range, it can be said that the porous layer has sufficient ion permeability.

The thickness of the porous layer is preferably not less than 0.1 μm, more preferably not less than 0.3 μm, and still more preferably not less than 0.5 μm. The thickness of the porous layer is preferably not more than 20 μm, more preferably not more than 10 μm, and still more preferably not more than 5 μm. Examples of a combination of a lower limit and an upper limit of the thickness of the porous layer include 0.1 μm to 20 μm, 0.3 μm to 10 μm, and 0.5 μm to 5 μm. If the thickness of the porous layer is within the above range, it is possible to exert a sufficient function of the porous layer (e.g., to impart heat resistance) and also to reduce the whole thickness of the separator.

(Examples of Preferable Combination of Resin and Filler)

In an embodiment, the resin contained in the porous layer has an intrinsic viscosity of 1.4 dL/g to 4.0 dL/g and the filler has an average particle diameter of not more than 1 μm. Use of the porous layer having such composition makes it possible to prepare a laminated separator which achieves all of heat resistance, ion permeability and reduction in thickness.

The intrinsic viscosity of the resin in the porous layer is preferably not less than 1.4 dL/g and more preferably not less than 1.5 dL/g. Meanwhile, the intrinsic viscosity of the resin in the porous layer is preferably not more than 4.0 dL/g, more preferably not more than 3.0 dL/g, and still more preferably not more than 2.0 dL/g. The porous layer containing the resin having an intrinsic viscosity of not less than 1.4 dL/g can impart sufficient heat resistance to the laminated separator. The porous layer containing the resin having an intrinsic viscosity of not more than 4.0 dL/g has sufficient ion permeability. See Examples of the present application for a method for measuring the intrinsic viscosity.

The resin having an intrinsic viscosity of 1.4 dL/g to 4.0 dL/g can be synthesized by adjusting a molecular weight distribution of the resin, the molecular weight distribution being adjusted by appropriately setting synthesis conditions (e.g., amount of monomers to be put in, synthesis temperature, and synthesis time). Alternatively, a commercially available resin having an intrinsic viscosity of 1.4 dL/g to 4.0 dL/g may be used. In an embodiment, the resin having an intrinsic viscosity of 1.4 dL/g to 4.0 dL/g is an aramid resin.

The filler contained in the porous layer has an average particle diameter of preferably not more than 1 μm, more preferably not more than 800 nm, still more preferably not more than 500 nm, still more preferably not more than 100 nm, and still more preferably not more than 50 nm. The average particle diameter of the filler here is an average value of sphere equivalent particle diameters of 50 particles of the filler. Further, the sphere equivalent particle diameters of the filler are each a value which is obtained by actual measurement with use of a transmission electron microscope. The following is a specific example of a measurement method.

1. An image of the filler is captured by using a transmission electron microscope (TEM; JEOL Ltd., transmission electron microscope JEM-2100F) at an acceleration voltage of 200 kV and at a magnification ratio of 10000 times with use of a Gatan Imaging Filter.

2. In the image thus obtained, an outline of a particle is traced by using image analysis software (ImageJ) and a sphere equivalent particle diameter of a filler particle (primary particle) is measured.

3. The above measurement is carried out for 50 filler particles which have been randomly extracted. The average particle diameter is an arithmetic average of sphere equivalent particle diameters of the 50 filler particles.

If the average particle diameter of the filler is set to not more than 1 μm, it is possible to reduce the thickness of the laminated separator. The average particle diameter of the filler has a lower limit that is not particularly limited, and that is, for example, 5 nm.

(1.1.2. Polyolefin Porous Film)

A laminated separator in accordance with an embodiment of the present invention includes a polyolefin porous film. Alternatively, the polyolefin porous film alone may be used as the separator in accordance with an embodiment of the present invention though such a separator is not an aspect of the laminated separator.

Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the whole of materials of which the porous film is made.

The polyolefin porous film contains a polyolefin-based resin as a main component and has therein many pores connected to one another, so that gas and liquid can pass through the polyolefin porous film from one surface to the other. Note that, hereinafter, the polyolefin porous film is also simply referred to as a "porous film".

The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because the strength of the nonaqueous electrolyte secondary battery separator in accordance with an embodiment of the present invention improves.

Examples of the polyolefin include homopolymers and copolymers which are each obtained by polymerizing a monomer(s) such as ethylene, propylene, 1-butene, 4 methyl-1-pentene, 1-hexene, and/or the like.

Examples of such homopolymers include polyethylene, polypropylene, and polybutene. Meanwhile, examples of the copolymers include an ethylene-propylene copolymer.

Among the above polyolefins, polyethylene is more preferable as the polyolefin because it is possible to prevent a flow of an excessively large electric current at a lower temperature. Note that the phrase "to prevent a flow of an excessively large electric current" is also referred to as "shutdown".

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these polyethylenes, the polyethylene is preferably ultra-high molecular weight polyethylene having a weight-average molecular weight of not less than 1,000,000.

The weight per unit area of the porous film can be set as appropriate in view of strength, thickness, weight, and handleability. Note, however, that the weight per unit area of the porous film is preferably 4 g/m² to 20 g/m², more preferably 4 g/m² to 12 g/m², and still more preferably 5 g/m² to 10 g/m², so as to allow the nonaqueous electrolyte secondary battery to have a higher weight energy density and a higher volume energy density.

The porous film has an air permeability of preferably 30 s/100 mL to 500 s/100 mL, and more preferably 50 s/100 mL to 300 s/100 mL, in terms of Gurley values. A porous film having an air permeability in the above range can achieve sufficient ion permeability.

The porous film has a porosity of preferably 20% by volume to 80% by volume, and more preferably 30% by volume to 75% by volume, so as to (i) retain an electrolyte in a larger amount and (ii) obtain the function of reliably preventing a flow of an excessively large electric current at a lower temperature.

Further, in order to achieve sufficient ion permeability and prevent particles from entering the positive electrode and/or the negative electrode, the porous film has pores each having a pore diameter of preferably not more than 0.3 μm, and more preferably not more than 0.14 μm.

The laminated separator may further include another layer(s) such as an adhesive layer, a heat-resistant layer, a protective layer, and/or the like, in addition to the polyolefin porous film.

Further, the nonaqueous electrolyte secondary battery separator preferably has a thickness that makes it possible to have a sufficiently long distance which a dendrite travels before the micro short circuit occurs and that makes it possible to keep preferable ion conductivity.

In view of the above, the thickness of the polyolefin porous film is preferably not less than 4 μm, more preferably not less than 5 μm, and still more preferably not less than 6 μm. Meanwhile, the thickness of the polyolefin porous film is preferably not more than 29 μm, more preferably not more than 20 μm, and still more preferably not more than 15 μm. Examples of a combination of a lower limit and an upper limit of the thickness of the polyolefin porous film include 4 μm to 29 μm, 5 μm to 20 μm, and 6 μm to 15 μm.

[2. Method for Producing Nonaqueous Electrolyte Secondary Battery Separator]

[2.1. Method for Producing Polyolefin Porous Film]

The following method is an example of a method for producing the porous film. That is, first, a polyolefin-based resin is kneaded together with a pore forming agent such as an inorganic bulking agent or a plasticizer, and optionally with another agent(s) such as an antioxidant, so as to produce a polyolefin-based resin composition. Then, the polyolefin-based resin composition is extruded, so that a polyolefin-based resin composition in a sheet form is prepared. Further, the pore forming agent is removed from the polyolefin-based resin composition in the sheet form with use of an appropriate solvent. Thereafter, the polyolefin porous film can be produced by stretching the polyolefin-based resin composition from which the pore forming agent has been removed.

The inorganic bulking agent is not particularly limited. Examples of the inorganic bulking agent include inorganic fillers; one specific example is calcium carbonate. The plasticizer is not particularly limited. The plasticizer can be a low molecular weight hydrocarbon such as liquid paraffin.

The method for producing the porous film can be, for example, a method including the following steps:

(i) obtaining a polyolefin-based resin composition by kneading an ultra-high molecular weight polyethylene having a weight-average molecular weight of not less than 1,000,000, a low molecular weight polyolefin having a weight-average molecular weight of not more than 10,000, a pore forming agent such as calcium carbonate or a plasticizer, and an antioxidant;

(ii) forming a sheet by cooling, in stages, the polyolefin-based resin composition obtained;

(iii) removing, with use of an appropriate solvent, the pore forming agent from the sheet obtained; and (iv) stretching, at an appropriate stretch ratio, the sheet from which the pore forming agent has been removed.

[2.2. Method for Producing Porous Layer]

The porous layer can be formed with use of a coating solution in which the resin described in the section (Resin) is dissolved or dispersed in a solvent. Further, the porous layer containing the resin and the filler can be formed with use of a coating solution which is obtained by (i) dissolving or dispersing the resin in a solvent and (ii) dispersing the filler in the solvent.

Note that the solvent can be a solvent in which the resin is to be dissolved. Further, the solvent can be a dispersion medium in which the resin or the filler is to be dispersed. Examples of a method for forming the coating solution include a mechanical stirring method, an ultrasonic dispersion method, a high-pressure dispersion method, and a media dispersion method.

Examples of the method for forming the porous layer include: a method in which the coating solution is applied directly to a surface of a base material and then the solvent is removed; a method in which (i) the coating solution is applied to an appropriate support, (ii) the solvent is removed so that the porous layer is formed, (iii) the porous layer and the base material are bonded together by pressure, and then (iv) the support is peeled off; a method in which (i) the coating solution is applied to an appropriate support, (ii) the base material is bonded to a resultant coated surface by pressure, (iii) the support is peeled off, and then (iv) the solvent is removed; and a method in which dip coating is carried out by immersing the base material in the coating solution, and then the solvent is removed.

It is preferable that the solvent be a solvent which (i) does not adversely affect the base material, (ii) allows the resin to be dissolved uniformly and stably, and (iii) allows the filler to be dispersed uniformly and stably. The solvent can be one or more selected from the group consisting of, for example, N-methyl-2-pyrrolidone, N,N-dimethylacetamide, N,N-dimethylformamide, acetone, and water.

The coating solution can contain, as a component other than the above-described resin and the filler, for example, a disperser, a plasticizer, a surfactant, and a pH adjustor, when appropriate.

Note that the base material can be, for example, a film of another kind, a positive electrode, or a negative electrode, other than the above-described polyolefin porous film. When the base material for forming the porous layer is a polyolefin porous film, the laminated separator in accordance with an embodiment of the present invention can be produced.

The coating solution can be applied to the base material by a conventionally known method. Specific examples of such a method include a gravure coater method, a dip coater method, a bar coater method, and a die coater method.

If the coating solution contains an aramid resin, the aramid resin can be deposited by applying humidity to the coated surface. The porous layer can be formed in this way.

The solvent can be removed from the coating solution which has been applied to the base material, for example, by a method in which the solvent is removed, by air blow drying or heat drying, from a coating film which is a film of the coating solution.

Further, the porosity and the average pore diameter of the porous layer to be obtained can be adjusted by changing an amount of the solvent in the coating solution.

A suitable solid content concentration of the coating solution may vary depending on, for example, kinds of the filler, but generally, the solid content concentration is preferably higher than 3% by weight and not higher than 40% by weight.

When the base material is coated with the coating solution, a coating shear rate may vary depending on, for example, kinds of the filler. Generally, the coating shear rate is preferably not lower than 2 (1/s) and more preferably in the range of 4 (1/s) to 50 (1/s).

(Method for Preparing Aramid Resin)

Examples of a method for preparing the aramid resin include, but are not particularly limited to, condensation polymerization of para-oriented aromatic diamine and para-oriented aromatic dicarboxylic acid halide. In such a method, the aramid resin obtained is substantially composed of repeating units in which amide bonds occur at para or quasi-para positions of the aromatic ring. "Quasi-para positions" refers to positions at which bonds extend in opposing directions from each other, coaxially or in parallel, such as 4 and 4' positions of biphenylene, 1 and 5 positions of naphthalene, and 2 and 6 positions of naphthalene.

A solution of poly(paraphenylene terephthalamide) can be prepared by, for example, a method including the following specific steps (I) through (IV).

(I) N-methyl-2-pyrrolidone is introduced into a dried flask. Then, calcium chloride which has been dried at 200° C. for 2 hours is added. Then, the flask is heated to 100° C. to completely dissolve the calcium chloride.

(II) The solution obtained in the step (I) is returned to room temperature, and then paraphenylenediamine is added and completely dissolved.

(III) While a temperature of the solution obtained in the step (II) is maintained at 20±2° C., terephthalic acid dichloride is added, the terephthalic acid dichloride being divided into 10 separate identical portions added at approximately 5-minute intervals.

(IV) While a temperature of the solution obtained in the step (III) is maintained at 20±2° C., the solution is aged for 1 hour, and is then stirred under reduced pressure for 30 minutes to eliminate air bubbles, so that the solution of the poly(paraphenylene terephthalamide) is obtained.

[2.3. Method for Controlling Surface Smoothness]

Examples of factors which control the smoothness of a porous layer surface include a dispersion state of the coating solution. When the base material is coated with a coating solution in a sufficient dispersion state, a separator which satisfies the smoothness conditions is likely to be obtained.

For example, stirring is generally included in preparation of the coating solution. When a time from completion of the stirring to coating of the coating solution is short, it is possible to coat the base material with the coating solution in a sufficient dispersion state. In an embodiment, the time from completion of last stirring in preparation of the coating solution to coating of the base material with the coating solution is preferably less than 1 hour, more preferably not more than 30 minutes, and more preferably not more than 10 minutes.

Further, the coating solution which has been subjected to a microbubble treatment may keep the sufficient dispersion state for a longer time. When the coating solution has been subjected to the microbubble treatment, the time from completion of last stirring in preparation of the coating solution to coating of the base material with the coating solution is preferably not more than 20 days, more preferably not more than 48 hours, and more preferably not more than 24 hours. The coating solution is subjected to the microbubble treatment for preferably not less than 30 minutes, and more preferably not less than 60 minutes. An upper limit of a time for which the coating solution is subjected to the microbubble treatment is not particularly limited, and for example, 72 hours.

Another example of the factors which control the smoothness of the porous layer surface is the particle diameter of the filler or the proportion of the filler contained. If the particle diameter of the filler is too large or the proportion of the filler contained is too large, the surface of the porous layer tends to be uneven due to the filler. This is because filler particles often have an uneven surface and are not planar. On the other hand, if the resin is contained in the porous layer at a higher proportion, the porous layer surface tends to become smoother since the resin has higher flexibility than the filler. The average particle diameter (D50) and the proportion of the filler contained are preferably those described above.

Examples of the factors which control the smoothness of a polyolefin porous film surface include coating speed and flatness of a coating bar. Specifically, if the coating speed is slower, a separator which satisfies the smoothness conditions is likely to be obtained.

[2.4. Method for Adjusting Compressive Elastic Modulus in Thickness Direction]

The compressive elastic modulus in the thickness direction of the separator can be adjusted, for example, by using an appropriate combination of materials of the porous layer and the polyolefin porous film.

[3. Nonaqueous Electrolyte Secondary Battery Member and Nonaqueous Electrolyte Secondary Battery]

In a member for a nonaqueous electrolyte secondary battery (herein also referred to as a "nonaqueous electrolyte secondary battery member") in accordance with an embodiment of the present invention, a positive electrode, the above-described separator, and a negative electrode are arranged in this order. A nonaqueous electrolyte secondary battery in accordance with an embodiment of the present invention includes the above-described separator. In the nonaqueous electrolyte secondary battery member and the nonaqueous electrolyte secondary battery, the separator is provided such that the surface of the separator satisfies the above-described smoothness conditions, the surface facing the negative electrode.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery is, for example, a nonaqueous electrolyte secondary battery that achieves an electromotive force through doping with and dedoping of lithium. The nonaqueous electrolyte secondary battery includes the nonaqueous electrolyte secondary battery member which is made of a positive electrode, the above-described separator, and a negative electrode formed in this order. Note that components of the nonaqueous electrolyte secondary battery other than the above-described separator are not limited to those described below.

The nonaqueous electrolyte secondary battery is generally structured such that a battery element is enclosed in an exterior member, the battery element including (i) a structure in which the negative electrode and the positive electrode face each other via the above-described separator and (ii) an electrolyte with which the structure is impregnated. Note that the doping means occlusion, support, adsorption, or insertion, and means a phenomenon in which lithium ions enter an active material of an electrode (e.g., a positive electrode).

Since the nonaqueous electrolyte secondary battery member includes the above-described separator, the nonaqueous electrolyte secondary battery member, when incorporated in the nonaqueous electrolyte secondary battery, can prevent a micro short circuit of the nonaqueous electrolyte secondary battery from occurring and consequently can improve safety of the nonaqueous electrolyte secondary battery. Further, since the nonaqueous electrolyte secondary battery includes the above-described separator, the nonaqueous electrolyte secondary battery can prevent a micro short circuit from occurring and is excellent in safety.

The nonaqueous electrolyte secondary battery can be produced by a conventionally known method. As one example, first, the nonaqueous electrolyte secondary battery member is formed by providing a positive electrode, the separator, and a negative electrode in this order. Next, the nonaqueous electrolyte secondary battery member is inserted into a container which serves as a housing for the nonaqueous electrolyte secondary battery. Further, the container is filled with a nonaqueous electrolyte, and then hermetically sealed while pressure is reduced in the container. In this way, the nonaqueous electrolyte secondary battery can be produced.

[3.1. Positive Electrode]

The positive electrode employed in an embodiment of the present invention is not limited to any particular one, provided that the positive electrode is one that is generally used as a positive electrode of a nonaqueous electrolyte secondary battery. Examples of the positive electrode include a positive electrode sheet having a structure in which an active material layer, containing a positive electrode active material and a binding agent, is formed on a positive electrode current collector. Note that the active material layer may further contain an electrically conductive agent and/or a binding agent.

Examples of the positive electrode active material include materials each capable of being doped with and dedoped of lithium ions. Specific examples of the materials include lithium complex oxides each containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one of the above electrically conductive agents, or two or more of the above electrically conductive agents in combination.

Examples of the binding agent include: fluorine-based resins such as polyvinylidene fluoride (PVDF); acrylic resin; and styrene butadiene rubber. Note that the binding agent serves also as a thickener.

Examples of the positive electrode current collector include electric conductors such as Al, Ni, and stainless steel. Among these electric conductors, Al is more preferable because Al is easily processed into a thin film and is inexpensive.

Examples of a method for producing the positive electrode sheet includes: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

[3.2. Negative Electrode]

The negative electrode employed in an embodiment of the present invention is not limited to any particular one, provided that the negative electrode is one that is generally used as a negative electrode of a nonaqueous electrolyte secondary battery. Examples of the negative electrode include a negative electrode sheet having a structure in which an active material layer, containing a negative electrode active material and a binding agent, is formed on a negative electrode current collector. Note that the active material layer may further contain an electrically conductive agent and/or a binding agent.

Examples of the negative electrode active material include materials each capable of being doped with and dedoped of lithium ions. Examples of the materials include carbonaceous materials. Examples of the carbonaceous materials include natural graphite, artificial graphite, cokes, carbon black, and pyrolytic carbons.

Examples of the negative electrode current collector include Cu, Ni, and stainless steel. Among these materials, Cu is more preferable because Cu is not easily alloyed with lithium and is easily processed into a thin film.

Examples of a method for producing the negative electrode sheet include: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressure is applied so that the paste is firmly fixed to the negative electrode current collector. The paste preferably contains the above-described electrically conductive agent and the binding agent as described above.

[3.3. Nonaqueous Electrolyte]

A nonaqueous electrolyte for an embodiment of the present invention is not limited to any particular one, provided that the nonaqueous electrolyte is one that is generally used for a nonaqueous electrolyte secondary battery such as a lithium ion secondary battery. The nonaqueous electrolyte can be, for example, a nonaqueous electrolyte containing an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one of the above lithium salts or two or more of the above lithium salts in combination.

Examples of the organic solvent to be contained in the nonaqueous electrolyte include carbonates, ethers, esters, nitriles, amides, carbamates, sulfur-containing compounds, and fluorine-containing organic solvents each obtained by introducing a fluorine group into any of these organic solvents. It is possible to use only one of the above organic solvents or two or more of the above organic solvents in combination.

EXAMPLES

The following description will discuss embodiments of the present invention in greater detail with reference to Examples and Comparative Examples. Note, however, that the present invention is not limited to the following Examples.

[Measurements of Physical Properties]

In Examples and Comparative Examples, physical properties etc. of nonaqueous electrolyte secondary battery separators and polyolefin porous films were measured by the following method.

(1) Thickness

The thickness of the nonaqueous electrolyte secondary battery separators was measured with use of a high-precision digital measuring device (manufactured by Mitutoyo Corporation). Specifically, each of the nonaqueous electrolyte secondary battery separators was cut into a square with an 8 cm side, and measurement was made at five points in the square. An average value of resultant measurements was defined as the thickness.

(2) Surface Smoothness

The following method was used to calculate surface smoothness.

1. A laminated separator was fixed to a glass plate such that the porous layer is on an upper side.

2. An optical microscopic image of a porous layer surface was captured (magnification ratio: 1000 times) by using an optical microscope (VHX-1000, manufactured by Keyence Corporation).

3. With use of built-in software of the optical microscope, a 3D image of a standard sample, whose height of unevenness had been adjusted to 54.6 µm, was created by selecting an automatic 3D synthesis button from a high image quality depth synthesis tab. Such a 3D image was obtained by superimposing images which had been captured at 0.5 µm intervals in a depth direction of the standard sample. The highest point (the point at a height of 54.6 µm) of this standard sample 3D image was shown in red, the lowest point (the point at a height of 0 µm) of this standard sample 3D image was shown in blue, and the other parts were shown in gradation representation in accordance with the height of unevenness.

4. A 3D image of the porous layer was created by a procedure as described in the above step 3. With use of the build-in software, the 3D image of the porous layer was shown in gradation representation in accordance with the height of unevenness, by selecting a 3D comparison mode button and making a comparison with the standard sample 3D image which had been created in the above step 3.

5. A resultant 3D image was read by using image analysis software Image J (provided by the National Institute of Health), and a rectangular area was selected so that all bumps and dents (unevenness) in the resultant 3D image was contained in the rectangular area (polygon tool was used). In selecting the rectangular area, care was taken so that an area irrelevant to a separator surface (e.g., file name of the image, black background, etc.) would not be contained in the rectangular area.

6. "Edit-clear outside" was selected from a pulldown menu, and a portion which was outside the area selected was trimmed.

7. "Analyze-histogram" was selected from the pulldown menu, and unevenness data was automatically analyzed. As a result of this operation, a maximum value, a minimum value, an average value and a standard deviation value are calculated. This standard deviation value corresponds to a standard deviation of a data group of heights from a reference level.

8. "Set measurement kurtosis" was checked and "Analyze measure" was selected. As a result of this operation, the kurtosis of the data group of the heights from the reference level is calculated.

A positive kurtosis value of the data group of the heights from the reference level indicates a distribution that is shaper than a normal distribution. A negative kurtosis value of the data group of the heights from the reference level indicates a distribution that is broader than the normal distribution.

(3) Compressive Elastic Modulus

A displacement ratio was obtained from compression properties of the laminated separator, the compression properties having been measured by using a micro compression tester (MCT-510, manufactured by Shimadzu Corporation). A measurement mode was set to a loading and unloading test mode at a set indentation depth. Specifically, a separator was measured in advance for the thickness. Then, the separator was cut into a square with a 1 cm side, and bonded onto a measurement stage. Then, a compression test was carried out by using a plane indenter (50 μm in diameter) at a loading rate of 0.45 mN/sec, until a load was increased to 20 mN. A slope [N/μm] was obtained by linear approximation in a range of 5 mN to 15 mN of a displacement-load curve thus obtained. The following formula was used to calculate the compressive elastic modulus.

Compressive elastic modulus $[P]$=slope $[N/\mu m]$*thickness $[\mu m]$/indenter area $[m^2]$ (4) Shape of Dendrite A CR2032-type coin cell configured as below was assembled in an argon glove box. As an electrolyte, an ethylene carbonate/diethyl carbonate (1/1=vol/vol, manufactured by Tomiyama Pure Chemical Industries, Ltd.) solution of $LiClO_4$ (1M) was used.

Working electrode: graphite mix electrode and Cu foil

Laminated separators (each having a porous layer provided on a graphite mix electrode side) prepared in Examples and Comparative Examples Counter electrode: Li (thickness: 200 μm, manufactured by Honjo Metal Co., Ltd.)

The coin cell assembled was subjected to the following steps.

1. The coin cell was left to stand still for 4 hours so as to be impregnated with the electrolyte.
2. At room temperature, one charge and discharge cycle was carried out at a current density of 0.2 $mA/cm^2$ and in a voltage range of 3 V to 0.005 V.
3. At the current density of 0.2 $mA/cm^2$, the coin cell was fully charged to 0.005 V.
4. At the current density of 6 $mA/cm^2$, the coin cell was overcharged for 333 seconds. This caused deposition of Li on the graphite mix electrode.
5. In an argon glove box, the electrolyte having adhered onto the graphite mix electrode was cleaned with diethyl carbonate.
6. While argon was kept hermetically sealed, a sample taken out was observed under a scanning electron microscope (SEM).

A dendrite whose shape was granular and/or tabular did not grow in a thickness direction of a separator, and therefore, the separator containing such a dendrite was determined to have a great short circuit prevention effect. On the other hand, a dendrite whose shape was fibrous grew in the thickness direction of a separator. This dendrite is likely to penetrate through the separator. Therefore, the separator containing such a dendrite was determined to have a small short circuit prevention effect.

(5) Intrinsic Viscosity

A flow time was measured by an Ubbelohde capillary viscometer. This measurement was made for (i) a solution in which 0.5 g of an aramid resin was dissolved in 100 mL of a concentrated sulfuric acid (96% to 98%) and (ii) the concentrated sulfuric acid (96% to 98%) in which no resin was dissolved. During the measurement, the temperature was set at 30° C. The following formula was used to obtain an intrinsic viscosity from the flow time obtained.

Intrinsic viscosity=$\ln(T/T_0)/C$ (unit: dL/g)

T: Flow time of concentrated sulfuric acid solution of aramid resin $T_0$: Flow time of concentrated sulfuric acid C: Concentration of aramid resin in concentrated sulfuric acid solution of aramid resin (g/dL)

Synthesis Example 1

According to the following procedure, poly(paraphenylene terephthalamide) was synthesized.

1. A separable flask (capacity: 3 L) having a stirring blade, a thermometer, a nitrogen inlet pipe, and a powder addition port was prepared.
2. The separable flask was sufficiently dried, and 2200 g of N-methyl-2-pyrrolidone (NMP) was put in the separable flask.
3. Then, 151.07 g of calcium chloride powder (having been subjected to vacuum drying at 200° C. for 2 hours) was added and the temperature was increased to 100° C., so that the calcium chloride powder was completely dissolved.
4. The temperature of a resultant calcium chloride NMP solution was decreased back to room temperature.
5. Further, 68.23 g of paraphenylenediamine was added and completely dissolved.
6. While the temperature of the solution thus obtained was maintained at 20° C.±2° C., 124.61 g of terephthalic acid dichloride was divided into 10 portions and added at approximately 5-minute intervals.
7. While the temperature of a solution thus obtained was maintained at 20° C.±2° C., the solution was aged for 1 hour while being stirred.
8. The solution thus aged was filtrated through a 1500-mesh stainless steel gauze. In this way, an aramid polymerization liquid 1 was obtained.

The poly(paraphenylene terephthalamide) contained in the aramid polymerization liquid 1 had an intrinsic viscosity of 1.7 g/dL.

Synthesis Example 2

An aramid polymerization liquid 2 was obtained as in Synthesis Example 1, except that the amount of the terephthalic acid dichloride added was changed to 124.48 g. The poly(paraphenylene terephthalamide) contained in the aramid polymerization liquid 2 had an intrinsic viscosity of 1.6 g/dL.

Example 1

First, 100 g of the aramid polymerization liquid 1 was weighed in a flask. Then, 6.0 g of Alumina C (manufactured by Nippon Aerosil Co., Ltd., average particle diameter: 0.013 μm) and 6.0 g of AKP-3000 (manufactured by Sumitomo Chemical Co., Ltd., average particle diameter: 0.7 μm) were added. At this point, the weight ratio of the poly(paraphenylene terephthalamide) to the entire amount of alumina was 33:67. Next, NMP was added so that a solid content became 6.0% by weight, and stirring was carried out for 240 minutes. The "solid content" here refers to the total weight of the poly(paraphenylene terephthalamide) and the alumina. Further, 0.73 g of calcium carbonate was added and stirring was carried out for 240 minutes, so that a resultant solution was neutralized and a slurry coating solution 1 was prepared.

The coating solution 1 was left to stand still for 8 minutes. Thereafter, the coating solution 1 was applied, by a doctor blade method, onto a polyolefin porous film (thickness: 12 µm) made of polyethylene. A resultant coated material 1 was left to stand still in the air at 50° C. and at a relative humidity of 70% for 1 minute, so that poly(paraphenylene terephthalamide) was deposited. Next, the coated material 1 was immersed in ion-exchange water, so that calcium chloride and a solvent were removed. Subsequently, the coated material 1 was dried in an oven at 70° C., and a laminated separator 1 was obtained. Table 1 shows physical properties of the laminated separator 1.

Example 2

A slurry coating solution 2 was obtained as in Example 1, except that the solution neutralized was subjected to a microbubble treatment for 30 minutes. The microbubble treatment was carried out by supplying nitrogen through a pipe in the vicinity of the stirrer, while the coating solution was stirred with use of a stirring bar and a stirrer by using a Three-One motor (manufactured by SHINTO Scientific Co., Ltd.). A laminated separator 2 was obtained as in Example 1, except that the coating solution 2 left to stand still for 3 minutes was used. Table 1 shows physical properties of the laminated separator 2.

Example 3

First, 100 g of the aramid polymerization liquid 2 was weighed in a flask. Then, 6.0 g of Alumina C (manufactured by Nippon Aerosil Co., Ltd., average particle diameter: 0.013 µm) was added. At this point, the weight ratio of the poly(paraphenylene terephthalamide) to the entire amount of alumina was 1:1. Next, NMP was added so that a solid content became 4.5% by weight, and stirring was carried out for 240 minutes. The "solid content" here refers to the total weight of the poly(paraphenylene terephthalamide) and the alumina. Further, 0.73 g of calcium carbonate was added and stirring was carried out for 240 minutes, so that a resultant solution was neutralized and a slurry coating solution 3 was prepared. A laminated separator 3 was obtained as in Example 1, except that the coating solution 3 left to stand still for 8 minutes was used. Table 1 shows physical properties of the laminated separator 3.

Example 4

A slurry coating solution 4 was obtained as in Example 3, except that the solution neutralized was subjected to a microbubble treatment for 30 minutes. The microbubble treatment was carried out by supplying nitrogen through a pipe in the vicinity of the stirrer, while the coating solution was stirred with use of a stirring bar and a stirrer by using a Three-One motor (manufactured by SHINTO Scientific Co., Ltd.). A laminated separator 4 was obtained as in Example 3, except that the coating solution 4 left to stand still for 3 minutes was used. Table 1 shows physical properties of the laminated separator 4.

Comparative Example 1

A comparative coating solution 1 was prepared by mixing 9 g of polyvinylidene fluoride resin, 0.8 g of alumina having an average particle diameter of 500 nm, and 0.2 g of alumina having an average particle diameter 50 nm. The comparative coating solution 1 having been left to stand still for 8 minutes was applied to one surface of a polyethylene film (thickness: 12 µm), so that a comparative laminated separator 1 was obtained.

Comparative Example 2

A comparative laminated separator 2 was obtained as in Example 1, except that coating was carried out after the coating solution 1 had been left to stand still for 1 hour and 50 minutes. Table 1 shows physical properties of the comparative laminated separator 2.

Comparative Example 3

A comparative laminated separator 3 was obtained as in Example 1, except that coating was carried out after the coating solution 1 had been left to stand still for 72 hours. Table 1 shows physical properties of the comparative laminated separator 3.

TABLE 1

| | Thickness (µm) | Surface smoothness (*1) | Kurtosis | Compressive elastic modulus (MPa) | Shape of dendrite | Short circuit prevention effect |
|---|---|---|---|---|---|---|
| Example 1 | 16 | 92-124 / 111 / 6 | 26.5 | 92 | Granular | Great |
| Example 2 | 16 | 86-118 / 108 / 5 | 10.3 | 78 | Tabular | Great |
| Example 3 | 15 | 46-125 / 105 / 10 | 6.6 | 108 | Tabular | Great |
| Example 4 | 14 | 69-128 / 110 / 7 | 8.2 | 89 | Granular and tabular | Great |
| Comparative Example 1 | 14 | 41-132 / 110 / 16 | 3.8 | 72 | Fibrous | Small |
| Comparative Example 2 | 16 | 54-131 / 102 / 15 | 0.466 | 129 | Fibrous and granular | Small |

TABLE 1-continued

|  | Thickness (μm) | Surface smoothness (*1) | Kurtosis | Compressive elastic modulus (MPa) | Shape of dendrite | Short circuit prevention effect |
|---|---|---|---|---|---|---|
| Comparative Example 3 | 16 | 51-173<br>108<br>17 | 0.327 | 141 | Fibrous and granular | Small |

(*1) In each cell, the numbers at the top show the minimum value and the maximum value, the number at the middle shows an average value, and the number at the bottom shows the standard deviation.

[Results]

With regard to the laminated separators 1 to 4, the kurtosis of the data group of the heights from the reference level was not less than 5 and the standard deviation of the data group of the heights from the reference level was not more than 12. That is, the laminated separators 1 to 4 each had a smooth surface. As a result, a dendrite generated due to overcharging grew in a granular manner or a tabular manner. In other words, it can be said that the laminated separators 1 to 4 each have a great short circuit prevention effect. It is inferred that this is a result of formation of a porous layer with the coating solution in which fine bubbles were remaining due to application of the coating solution immediately after preparation of the coating solution or due to the microbubble treatment of the coating solution.

With regard to the comparative laminated separators 1 to 3, the kurtosis of the data group of the heights from the reference level was less than 5 and the standard deviation of the data group of the heights from the reference level was more than 12. That is, the comparative laminated separators 1 to 3 each had a non-smooth surface. As a result, a dendrite generated due to overcharging grew in a fibrous manner. In other words, it can be said that the comparative laminated separators 1 to 3 each have a small short circuit prevention effect.

Further, the laminated separators 1 to 4 each had a compressive elastic modulus of not less than 50 MPa in the thickness direction of the separator. In other words, the laminated separators 1 to 4 each have sufficient rigidity in the thickness direction, and therefore, voids are unlikely to occur at a boundary between the negative electrode and the separator. Also in this regard, the laminated separators 1 to 4 each can be said to have a great short circuit prevention effect.

INDUSTRIAL APPLICABILITY

A nonaqueous electrolyte secondary battery separator in accordance with an embodiment of the present invention can be used for production of a nonaqueous electrolyte secondary battery in which the occurrence of a micro short circuit during charging and discharging is restrained and which is excellent in safety.

The invention claimed is:

1. A nonaqueous electrolyte secondary battery separator, wherein
   the separator is a laminated separator comprising a porous layer and a polyolefin porous film,
   when unevenness data of at least one surface of the porous layer of the separator is analyzed,
   kurtosis of a data group of heights from a reference level is not less than 5, the kurtosis of the data group indicating a distribution curve sharper than a normal distribution curve when the kurtosis is not less than 0, and the kurtosis that is larger indicating a sharper distribution curve, and
   standard deviation of the data group of the heights from the reference level is not more than 12.

2. The separator as set forth in claim 1, wherein the porous layer contains a nitrogen-containing aromatic resin.

3. The separator as set forth in claim 2, wherein the nitrogen-containing aromatic resin is an aramid resin.

4. The separator as set forth in claim 1, wherein a compressive elastic modulus in a thickness direction is not less than 50 MPa.

5. A nonaqueous electrolyte secondary battery member, comprising a positive electrode, a separator recited in claim 1, and a negative electrode, which are formed in this order.

6. A nonaqueous electrolyte secondary battery, comprising a separator recited in claim 1.

7. A nonaqueous electrolyte secondary battery, comprising a nonaqueous electrolyte secondary battery member recited in claim 5.

8. The separator as set forth in claim 1, wherein the porous layer contains a filler, and wherein the filler consists of an inorganic filler.

* * * * *